Nov. 1, 1949.   J. G. ABBOTT   2,486,377
ALTERNATOR SYSTEM
Filed Feb. 5, 1946

*INVENTOR.*
JEROME G. ABBOTT
BY
*William D. Hall -*
*Attorney*

Patented Nov. 1, 1949

2,486,377

UNITED STATES PATENT OFFICE 2,486,377

ALTERNATOR SYSTEM

Jerome G. Abbott, Red Bank, N. J., assignor to the United States of America as represented by the Secretary of War Application February 5, 1946, Serial No. 645,677

2 Claims. (Cl. 322—28)

(Granted under the act of March 3, 1883, as amended April 30, 1928; 370 O. G. 757)

The invention described herein may be manufactured and used by or for the Government for governmental purposes, without the payment to me of any royalty thereon.

The invention relates to alternators.

Alternators presently obtainable are either continuously excited by external means such as a direct current generator or where self excited an extra source of electrical energy is required to excite the field for the purpose of starting the armature voltage build-up. It is frequently desirable to operate an alternator when no external source of electrical energy is available. It is therefore an object of the invention to provide a means whereby an alternator may be entirely self-excited.

It is also an object of the invention to provide a means to closely and automatically regulate the output voltage of an alternator.

These objects, together with other objects and advantages of the invention which will be apparent from a reading of the following specification, are achieved in a preferred embodiment of the invention by rectifying the output voltage of a movable primary transformer and impressing the resultant rectified voltage on the field winding of the alternator, the primary of the said transformer being positioned across the armature winding of the alternator. Means are provided to vary the flux coupling between the primary and secondary windings of the transformer by varying the position of the movable primary in accordance with the output voltage of the alternator.

Figure 1:
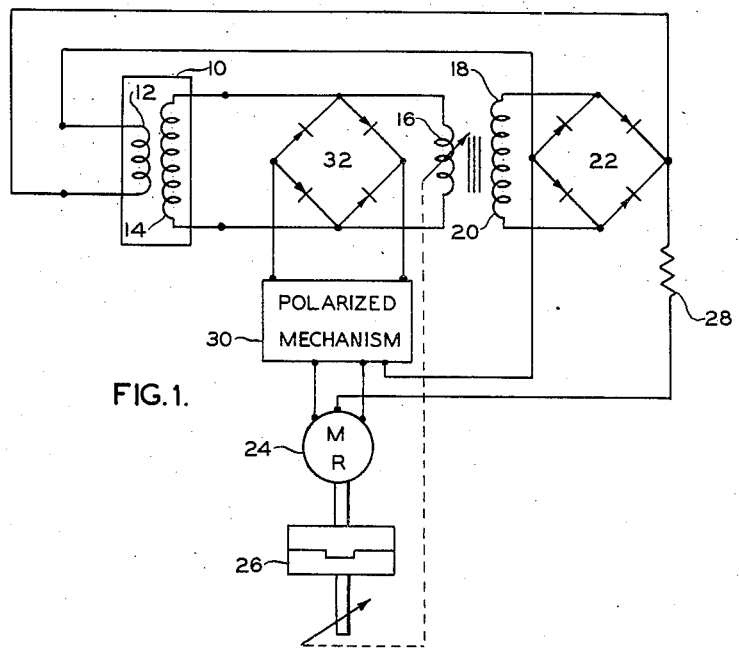
Figure 2:
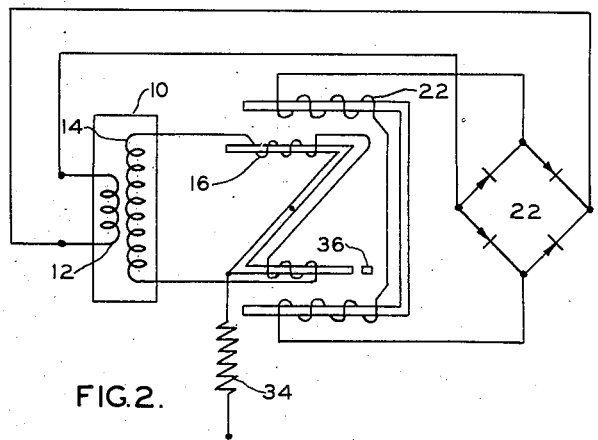

For a better understanding of the invention, reference is made to the following specification of a preferred embodiment of the invention, the said specification to be read in connection with the accompanying drawings, in which Figure 1 is a schematic drawing of a device embodying the invention and, Figure 2 is a schematic drawing of a second device embodying the invention.

Referring to the drawings, an alternator 10 having a field winding 12 and an armature winding 14 is driven by a prime mover (not shown). A primary winding 16 of a step-up transformer 18 is connected across the armature winding 14. The secondary winding 20 of the transformer 18 is connected across conjugate points of a bridge rectifier 22, part of the rectified output thereof being impressed on the field winding 12.

The transformer 18 is of a commmercially obtainable type have a primary 16 rotatable through 90 degrees with respect to the secondary 20. A rotation stop 36, Figure 2, is provided whereby rotation of the primary 16 is limited to 90 degrees from a position to full flux coupling with the secondary 20 to a position of minimum flux coupling with the said secondary.

Rotation of the primary 16 is accomplished by means of a reversible motor 24 mechanically connected to the primary 16 of the transformer 18 by a suitable gearing means (not shown) through a slip clutch 26. Excitation of the reversible motor 24 is accomplished by impressing on the said motor a small proportion of the output voltage of the rectifier 22 through a load 28, and the direction of rotation of the motor 24 is controlled by a standard, commercially obtainable, polarized mechanism 30. Operation of the mechanism 30 is accomplished by means of the rectified output of a rectifier 32 bridged across the armature winding 14.

For the purpose of illustrating the operation of the above described system, it will be assumed that it is desired to operate the alternator 10 at a rated output voltage of 120 volts under all load conditions. Bearing this assumption in mind, it will now be shown how the system will bring the alternator 10 up to the desired voltage output and how the system will automatically hold the alternator at that desired output voltage under varying load conditions.

A starting up of the alternator by its prime mover (not shown) will cause a small alternating voltage to be generated in the armature winding 14. This small voltage is generated due to the residual magnetism inherent in the field 12 of the alternator 10 and, in an alternator used to test the system herein described, amounted to three volts. This voltage, impressed on the primary 16 of the step-up transformer 18, results in a higher voltage appearing across the terminals of the secondary 20. This higher voltage is rectified by the rectifier 22 and the resultant rectified voltage is impressed across the field winding 12. A voltage being now impressed on the field 12, a higher voltage is in turn generated in the armature winding 14, which in turn results in a still higher rectified voltage being impressed on the field 12. This process is cumulative until a voltage slightly above the rated output of 120 volts is reached, at which point the procedure is halted by the reversal in direction of rotation of the reversible motor 24 to move the primary 16 to a position of proper flux linkage with the secondary 20, thereby reducing to a minimum the feedback from the rectifier 22 to the field 12 and thereby reducing the generated voltage in the field winding 14.

It will be seen that during the time that the voltage in the armature winding was building up to 120 volts, the reversible motor 24 held the primary 16 in full flux coupling with the secondary 20 and that the motor served to move the primary 16 out of full flux coupling when a voltage above 120 volts had been reached.

The polarized mechanism 30 may be set to operate at any predetermined voltage, and, in the case being illustrated, is set to operate when a voltage slightly above 120 volts is impressed upon the input terminals of the rectifier 32. Operation of polarized mechanism 30 causes a reversal of the polarity of the voltage impressed through the fields of the reversible motor 24 through the load 28, thereby causing a reversal in direction of rotation of said motor. Since the motor 24 is connected mechanically to the primary 16 of the step-up transformer 18 through a slip clutch 26, the primary 16 is rotated through 90 degrees until it is brought into engagement with the rotation stop 36 corresponding to the position of minimum flux linkage. At this point, movement of the primary 16 is arrested and the slip clutch turns within itself.

Since the primary 16 has been moved out of full magnetic engagement with the secondary 20 of the transformer 18, the output voltage across the armature winding 14 immediately falls, resulting in operation of mechanism 30 and reversal of direction of rotation of motor 24, which reversal of direction of rotation carries the primary 16 back through 90 degrees into full magnetic engagement with the secondary 20. As above indicated, when the primary 16 has reached the position of full magnetic engagement with the secondary 20, further rotation is prevented by rotation stop 36 and the slip clutch 26 moves within itself.

The primary 16 will remain in proper position of adequate magnetic coupling for all conditions tending to maintain the output voltage of the armature winding 14 under the rated output voltage of 120 volts. Thus, if the load on the alternator is increased, which normally causes the output voltage to fall, the rated voltage will be maintained by the increased feedback of rectified voltage to the field winding 12. Similarly, if the load were to decrease, an increase of output voltage would be prevented by movement of the primary 16.

It will be seen that as the alternator 10 is shut down, a decreasing voltage will appear across the armature winding 14. Automatic operation of the system above described will ensure that the primary 16 is in a position of full flux linkage with the secondary 20, thereby ensuring maximum flux linkage when the alternator 10 is again started.

Advantages of the above described system are obvious. There is provided a system whereby an alternator may be self-excited and self-regulated. The regulation is positive and immediate. A minimum of apparatus is required and the apparatus is simple and commercially obtainable.

In Figure 2 is shown a second device embodying the invention herein disclosed, a helical spring 34 being used to control the position of the movable primary 16. As the flux linkage between the primary 16 and the secondary 20 increases, the primary 16 will tend to be magnetically repelled and will rotate to a position of minimum flux coupling. The primary 16 will rotate against the tension of the spring 34. The spring 34 is of a predetermined tension, whereby the repulsion effect will overcome the tension of the spring when more than the rated voltage is generated in the alternator 10. The rotation stop 36 is provided to limit rotation of the primary 16 to 90 degrees.

It will be obvious that many modifications and changes may be made in the above described embodiments of the invention. For example, the system may be applied to polyphase operation as well as to the single phase operation herein described. Also, any suitable rectifier arrangement may be used, the bridge rectifier arrangement shown here being but a preferred arrangement. It is therefore intended that the invention be defined by the attached claims.

What is claimed is:

1. A system for self-excitation and automatic regulation of a driven alternator having an armature winding and a field winding, comprising a transformer having a primary and a secondary, the primary thereof being connected across said armature winding and being movable with respect to said secondary from a position of maximum flux linkage to a position of minimum flux linkage, means mechanically coupled to the movable primary of said transformer and responsive to the output voltage of the said armature winding to position said primary with respect to said secondary, and a rectifier having its input terminals connected across the said secondary and having its output terminals connected across said field winding to self-excite said alternator.

2. A system for self-excitation and automatic regulation of a driven alternator having an armature winding and a field winding, comprising a step-up transformer having a primary and a secondary, the primary thereof being connected across said armature winding and being movable with respect to said secondary from a position of maximum flux linkage to a position of minimum flux linkage, a reversible motor mechanically coupled to the movable primary of said step-up transformer through a slip clutch, and means to automatically determine the direction of rotation of said motor, the last named means including a rectifier having its input terminals connected across the said armature winding and having its output terminals connected to a polarized mechanism to operate at a predetermined voltage, whereby said motor will automatically reverse in direction of rotation at said predetermined voltage to rotate the movable primary of said step-up transformer with respect to the secondary, and a rectifier having its input terminals connected across said secondary and having its output terminals connected across the said field winding to self-excite said alternator.

JEROME G. ABBOTT.

REFERENCES CITED

The following references are of record in the file of this patent:

UNITED STATES PATENTS

| Number | Name | Date |
|---|---|---|
| 1,110,592 | Thomas | Sept. 15, 1914 |
| 1,841,082 | Biggs | Jan. 12, 1932 |
| 2,208,416 | Friedlander | July 16, 1940 |

FOREIGN PATENTS

| Number | Country | Date |
|---|---|---|
| 745,284 | France | May 8, 1933 |